United States Patent [19]

Srivastava

[11] 4,219,840
[45] Aug. 26, 1980

[54] COLOR CORRECTOR

[75] Inventor: Gopal Srivastava, Mt. Prospect, Ill.

[73] Assignee: Zenith Radio Corporation, Glenview, Ill.

[21] Appl. No.: 970,700

[22] Filed: Dec. 18, 1978

[51] Int. Cl.² .......................................... H04N 9/535
[52] U.S. Cl. ...................................................... 358/28
[58] Field of Search ........................................ 358/28

[56] References Cited
U.S. PATENT DOCUMENTS
3,749,825 7/1973 Moore ..................................... 358/28

Primary Examiner—Robert L. Richardson

[57] ABSTRACT

An automatic color corrector is disclosed for use in a color television receiver. To enable color correction of chroma signals within a selected range of the fleshtone axis, the outputs of the chroma demodulators are sensed to develop a control signal. In response to the control signal, a color modifier automatically reduces the gain of the (B−Y) demodulator by a predetermined factor. Preferably, the color modifier also adds a predetermined negative (B−Y) component of fixed value to the output of the (B−Y) demodulator. As a result, fleshtone chroma signals which otherwise have an unnatural cast are given a more natural color and the addition of the negative (B−Y) component causes the resultant color correction to be centered about the fleshtone axis.

21 Claims, 3 Drawing Figures

COLOR CORRECTOR

BACKGROUND OF THE INVENTION

This invention is directed generally to color television receivers, and more particularly to automatic color correction circuits for use in such receivers.

Modern television receivers commonly use some form of a color correction circuit, sometimes referred to as an "automatic tint control", to ensure that reproduced fleshtones appear to a viewer with the proper tint or hue. Some such circuits operate to change the phase of either the 3.58 megahertz reference signal and/or the 3.58 megahertz chroma signal to shift the phase of selected chroma signals toward fleshtone. Such phase-shifting type circuits typically include coils, capacitors and the like which cannot be fabricated on integrated circuits. Consequently, the use of such circuits in modern television receivers, which tend to be constructed using more integrated circuit chips is disadvantageous from a cost standpoint.

Several approaches have been proposed for correcting fleshtones by operating on chroma signals subsequent to their demodulation, thereby generally avoiding or at least reducing the number of coils and capacitors required for color correction. For example, U.S. Pat. No. 3,798,352 makes use of demodulated (B−Y) and (R−Y) color-difference signals for generating an error signal to modify the chroma signals. However, that disclosed structure requires variable resistors for accurately "setting up" the circuit. Because variable resistors are not readily fabricated on integrated circuits, its drawback is obvious for the reasons given above. In addition the range over which color correction occurs is sensitive to the amplitude of the color signals, thereby causing the correction range to be undesireably variable.

Another proposal for operating on demodulated chroma signals is disclosed in U.S. Pat. No. 3,749,825. According to this latter patent, demodulated (R−Y) and (G−Y) color difference signals are selectively combined to produce a correction signal which is applied to the demodulated (B−Y) color difference signal. However, the disclosed arrangement for developing the correction signal is somewhat sensitive to the d.c. quiescent voltages to which the color difference signals are referenced. Moreover, accurate set-up of the disclosed circuit requires a variable resistor which is not readily fabricated on an integrated circuit.

U.S. Pat. No. 3,821,790 describes a color correction circuit which combines the outputs of the (R−Y) and (B−Y) demodulators so as to alter their relative gain and develop a phase-shift when color correction is desired. Such correction is based on varying the a.c. impedance in (R−Y) and (B−Y) amplifiers, which impedance is developed by at least one capacitor which cannot be readily fabricated by integrated circuit technology.

Another aspect which is common to the prior art discussed above is that those color correctors operate in an "open loop" mode as opposed to a "closed loop" or feedback mode. Consequently, the degree of correction which they provide tends to vary from unit to unit rather than giving predictable and reproducible correction results.

For the foregoing reasons, prior color correction circuits have not been entirely satisfactory and have been largely unadaptable for fabrication on integrated circuit chips. Hence, their inclusion in television receivers utilizing integrated circuit technology remains undesirable, at least from a cost standpoint.

OBJECTS OF THE INVENTION

It is a general object of the invention to provide an improved color correction circuit which overcomes the deficiencies noted above.

It is a more specific object of the invention to provide a color correction circuit which is readily fabricated with integrated circuit technology.

It is a further object of the invention to provide such a color correction circuit which maintains proper fleshtones and avoids altering colors far removed from fleshtones, such as greens and blues.

It is another object of the invention to provide a color corrector of the "closed loop" or feedback type for developing predictable and reproducible correction results.

BRIEF DESCRIPTION OF THE FIGURES

The above-stated objects and other objects of the invention are more particularly set forth in the following detailed description and in the accompanying drawings of which.

SUMMARY OF THE INVENTION

The color correction circuit described herein includes a color modifier for modifying the gain of a (B−Y) demodulator in response to a control signal generated by sensing demodulated color-difference signals. More specifically, the color modifier responds to the control signal for altering the gain of the (B−Y) demodulator such that the output thereof is reduced by a predetermined fraction. Preferably, the color modifier also adds a predetermined negative (B−Y) component to the output of the (B−Y) demodulator, which component is selected such that demodulated chroma signals occurring in a range encompassing fleshtones are offset toward a selected fleshtone axis. Consequently, fleshtone chroma signals which otherwise appear too blue or too green are given a more natural color as a result of the reduced amplitude of their (B−Y) component, and the addition of the negative (B−Y) component causes the resultant color correction to be centered about the fleshtone axis.

The preferred embodiment achieves the functions described above with circuitry which is readily adaptable to fabrication in integrated circuit form.

DESCRIPTION OF THE PREFERRED EMBODIMENT

Figure 1:
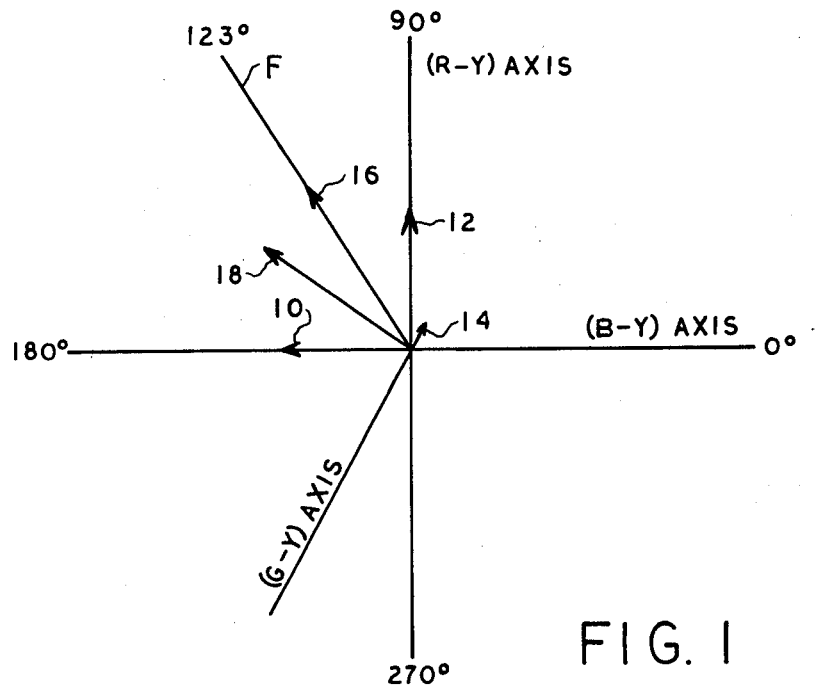
FIG. 1 is a color phase diagram useful in explaining certain aspects of the invention.

One of the principles utilized by the invention is that undesirable fleshtone variations can be reduced by altering only the (B−Y) color-difference signal. In addition, it has been found that unnatural purplish casts in a fleshtone are substantially removed by reducing the (B−Y) component thereof. When the fleshtone appears unnaturally green, a substantial negative (B−Y) component is present so that a reduction in the level of the negative (B−Y) component improves the reproduced fleshtone. This effect is more readily explained by reference to the conventional phase diagram shown in FIG. 1.

As shown, the (B−Y) axis is displaced by 90° from the (R−Y) axis. The (G−Y) axis is in the third quadrant of the diagram. A flesh vector comprises the vector resultant of (R−Y), (B−Y) and (G−Y) components and, when proper fleshtones are produced, the resultant lies along the fleshtone axis F. To produce a correct fleshtone vector, the (B−Y) component thereof is negative and has an amplitude as indicated by the arrowhead 10, the (R−Y) component is positive and has an amplitude as indicated by the arrowhead 12, and the (G−Y) component is negative and has an amplitude as indicated by the arrowhead 14. The resultant of those vector components is the vector 16 which lies on the fleshtone axis F.

When fleshtones are too green, as shown by the vector 18, that result is obtained largely because the negative (B−Y) component has increased in amplitude. Hence, a decrease in the amplitude of the (B−Y) vector causes the vector 18 to rotate clockwise toward the fleshtone axis F. Similarly, when fleshtones are too blue or purple, that result is substantially due to a large positive (B−Y) component. Accordingly, reducing the amplitude of the (B−Y) component under those circumstances shifts the resultant fleshtone vector toward the axis F.

Another factor taken into account by the invention is that reduction in the amplitude of the (B−Y) component does not necessarily ensure that the resultant fleshtone vector will be exactly along the axis F. Hence, according to one aspect of the invention, an offset signal is added to the (B−Y) component to ensure that chroma signals within a designated range of the axis F are shifted toward that axis. Such color correction is accomplished by a reliable and versatile correction circuit which is readily fabricated by integrated circuit technology.

Figure 2:
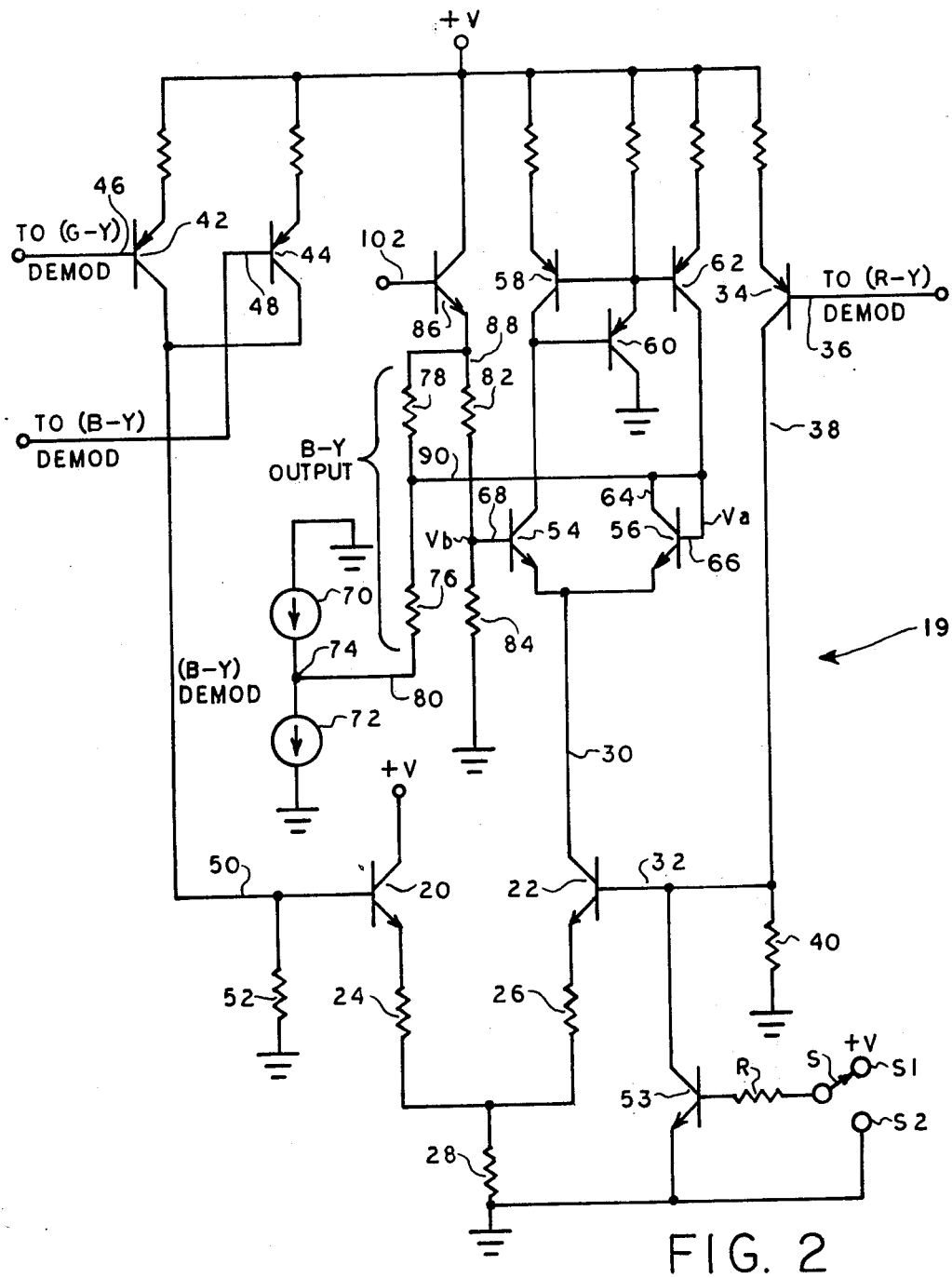
FIG. 2 is a circuit diagram illustrating a preferred embodiment of a color correction circuit according to the invention.

Referring now to FIG. 2, a preferred circuit arrangement is shown by effecting the functions described above. The color corrector is designated generally as 19 and includes a control signal generating means, comprising a pair of transistors 20 and 22, for generating a control signal in response to demodulator outputs indicative of reception of chroma signals in a selected phase range encompassing the fleshtone axis F. As shown, the transistors 20 and 22 are coupled in a differential amplifier configuration with emitter resistors 24, 26, and 28. Hence, one of the transistors 20, 22 wil always be conducting. In the illustrated embodiment, only the transistor 20 conducts when no color correction is to take place, and the transistor 22 conducts for developing a control signal in its collector lead 30 when correction is to take place. Thus, the transistors 20 and 22 and their associated circuit components act as an electronic switch for automatically enabling and disabling color correction.

To selectively actuate the transistor 22 when color correction is desired, the base terminal 32 of the latter transistor receives a demodulated (R−Y) color difference signal. That signal is generated by a transistor 34 whose base terminal 36 receives the output of the (R−Y) demodulator. The transistor 34 develops a corresponding collector current in the lead 38 for developing a corresponding voltage across a resistor 40. The latter resistor is coupled between ground and the base terminal of the transistor 22 so that an (R−Y) color difference signal is applied to the transistor 22.

In a similar manner, transistors 42 and 44 are coupled to the outputs of the (G−Y) and (B−Y) demodulators via their respective base terminals 46 and 48. The collector terminals of the transistors 44 and 46 are tied together and coupled via a lead 50 to the base terminal of the transistor 20, with a resistor 52 coupled between ground and the lead 50. By virtue of this arrangement, the voltage at the base terminal of the transistor 20 corresponds to the sum of the (G−Y) and (B−Y) color difference signals. It will be appreciated, therefore, that whenever the instantaneous value of the (R−Y) color difference signal is greater than the instantaneous sum of the (G−Y) and (B−Y) color difference signals, the transistor 22 conducts for generating the control signal on the lead 30. Hence, the control signal is generated only for chroma signals whose phase is on either side of and within a selected range of the fleshtone axis F.

To ensure that the transistor 22 remains off when no chroma signals are received, as during a black and white transmission, advantage is taken of the fact that the outputs of chroma demodulators ordinarily include a color difference signal superimposed on a known d.c. voltage level. By applying a smaller amount of that d.c. voltage to the base terminal of the transistor 22 than to the base terminal of the transistor 20, the transistor 22 is held off during black and white transmission. In addition, the range over which the transistor 22 conducts is thereby further limited so that chroma signals whose phase is far removed from the fleshtone axis are not corrected.

In the illustrated embodiment, the last mentioned function is achieved by selecting proper values for the resistors 52 and 40. Because quiescent currents from both the (G−Y) demodulator and the (B−Y) demodulator flow in the resistor 52, whereas only a single quiescent demodulator current flows in the resistor 40, the value of the resistor 52 is selected to be slightly greater than one-half the value of the resistor 40. Thus, the d.c. quiescent voltage at the base of the transistor 20 is caused to be greater than the d.c. quiescent voltage at the base terminal of the transistor 22. Where that difference is about 300 millivolts, the range over which the transistor 22 conducts has been found to be about 140 millivolts. That range may, of course, be changed by appropriate selection of resistors 40 and 52.

To permit an operator to turn the color correction circuit off and on as desired, the base terminal of the transistor 22 may be coupled to the collector terminal of another transistor 53. The base terminal of the latter transistor is coupled to an operator actuatable switch S via a resistor R. When the switch S engages contact $S_1$, a positive voltage is applied to the transistor 53 for turning it on, thereby grounding the base terminal of the transistor 22. Consequently, the transistor 22 remains off and no color correction is effected when the switch S engages the contact $S_1$. When the switch S engages the contact $S_2$, the base terminal of the transistor 53 is grounded, transistor 53 turns off, and transistor 22 is allowed to turn on in response to color difference signals of the appropriate amplitude.

In response to the occurrence of the control signal on the lead 30, a color modifier, including transistors 54 and 56, modifies the gain of the (B−Y) demodulator such that the output thereof is reduced by a predetermined factor, thereby effecting a shift in the effective phase of demodulated chroma signals occurring within the range of correction. It will be understood that the term "phase" is generally used with reference to chroma signals prior to their demodulation as shown, for example, in FIG. 1. However, the modification of the (B−Y) signal and its effect on the reproduced image is more conveniently expressed in terms of an "effective" phase change.

As shown, the transistors 54 and 56 are coupled in a differential amplifier configuration, their emitters being tied to the lead 30. Hence, the transistors 54 and 56 are "on" only when the control signal is present and color correction is effected then.

Gain reduction of the (B−Y) demodulator is achieved in the illustrated embodiment by modifying the load impedance across which the (B−Y) signal is generated. Such modifications occur automatically whenever the transistors 54 and 56 are turned on by the control signal.

To effect such modification, the collector circuits of the transistors 54 and 56 are coupled to a feedback arrangement comprising transistors 58, 60 and 62, with the collector terminal 64 of the transistor 56 being coupled to its base terminal 66. Suffice it to say at this juncture that the illustrated feedback arrangement operates to maintain the voltage Va at the base terminal 66 substantially equal to the voltage Vb at a base terminal 68 of the transistor 54. As will be shown, this substantial identity between the values of Va and Vb causes the load impedance (and the gain) of the (B−Y) demodulator to be reduced.

The output stage of a conventional (B−Y) demodulator is shown schematically as current sources 70 and 72. When a positive (B−Y) color difference signal is generated, the current source 70 may conduct. Conversely, when a negative (B−Y) color difference signal is generated, the current source 72 may conduct. To convert the current generated by the sources 70, 72 to a voltage, their common connection 74 is coupled to a (B−Y) load impedance comprising a plurality of serially connected impedances. In the illustrated embodiment, the (B−Y) demodulator load impedance includes resistors 76 and 78. One end of the load impedance is coupled to the output of the (B−Y) demodulator via a lead 80 and the other end thereof is coupled via a resistor 82 to the base input terminal of the transistor 54. The latter terminal is coupled through another resistor 84 to ground.

The demodulated (B−Y) output signal appears across the combination of the resistors 76 and 78. Hence, if the values of the resistors 76 and 78 are the same, and the resistor 78 is shunted, the gain of the (B−Y) demodulator is reduced by one-half. As will be shown, the operation of the transistors 54 and 56 causes the resistor 78 to be shunted so that the (B−Y) signal is developed across the resistor 76, thereby reducing the gain of the (B−Y) demodulator. The effect of the resistor 82 and another transistor 86 which is coupled to a junction 88 between the resistors 78 and 82 will be ignored for the moment.

Assuming for purposes of the present discussion that the value of the resistor 82 is negligibly small, the voltage Vb at the base terminal of the transistor 54 is the same as the voltage at the junction 88. In addition, the voltage at the junction between the resistors 76 and 78 is equal to Va because of the coupling thereto by a lead 90. Hence, when the transistors 54 and 56 operate to maintain substantial equality between the voltages Va and Vb, there is substantially no voltage drop across the resistor 78. Thus, there is no current flow through the resistor 78 and it is essentially shunted. Accordingly, the load impedance for the (B−Y) demodulator is reduced to the value of the resistor 76, thereby reducing the gain of the (B−Y) demodulator. The operation of the circuitry including transistors 54 and 56 is, therefore, like an electronic switch which closes in response to the control signal for shunting the resistor 78.

Figure 3:
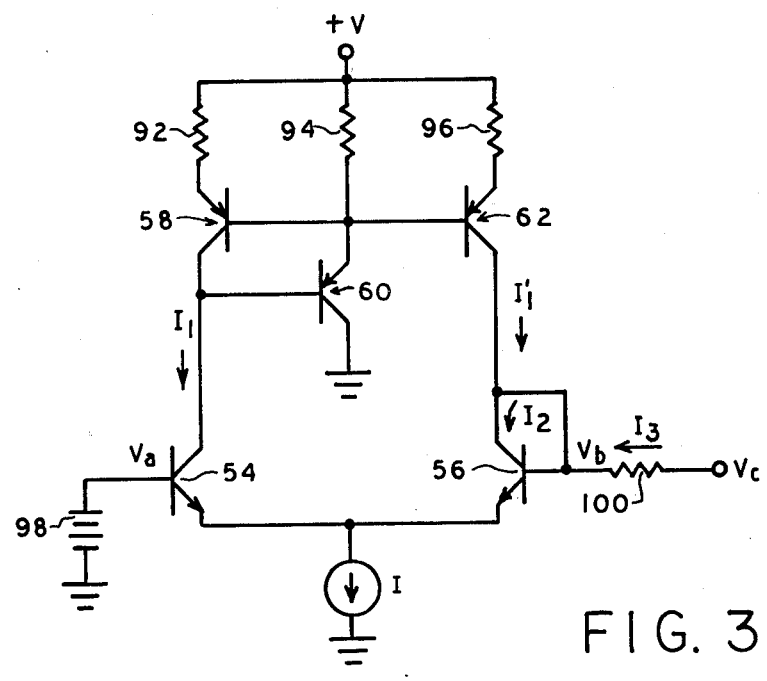
FIG. 3 is a circuit diagram of portions of the structure shown in FIG. 2, simplified to explain certain operative features of the preferred embodiment.

To better explain the way in which the voltages Va and Vb are held substantially equal, reference is made to FIG. 3 wherein the transistors 54–62 are redrawn along with equivalent circuits for some of the remaining circuitry shown in FIG. 2. As shown, the emitters of the transistors 58, 60 and 62 are coupled via resistors 92, 94 and 96 to a voltage source +V. The voltage Va is represented by a battery 98 because the voltage applied to the base of the transistor 54 may be a d.c. voltage supplied by the emitter of the transistor 86 (FIG. 2). The voltage Vc (FIG. 3) represents the equivalent open circuit voltage generated by the (B−Y) demodulator on the lead 90 (FIG. 2), and the resistor 100 represents the equivalent impedance as seen by the base terminal of the transistor 56. Further $I_1$ and $I_1'$ identify the collector currents of the transistors 58 and 62, respectively; $I_2$ identifies the collector current of the transistor 56; and $I_3$ represents the current through the resistor 100.

It will be understood that the transistors 58 and 62 are coupled in the configuration of a so-called "current mirror" so that the currents $I_1$ and $I_1'$ are maintained at substantially equal levels.

Assuming that at a given instant $V_b$ equals $V_c$, the current $I_3$ will be zero. Consequently, $I_1'$ will equal $I_2$ and $I_2$ will equal $I_1$. Because the collector currents of transistors 54 and 56 are thus equal, their base voltages $V_a$ and $V_b$ are also necessarily equal because of the inherent operation of the differential amplifier configuration of the transistors 54 and 56.

If $V_c$ now rises higher than $V_a$ (and $V_b$), a current $I_3$ flows in the resistor 100. As a result, the current $I_2$ rises above the level of the current $I_1$. As the current $I_2$ increases, the current $I_1$ decreases because the sum of the currents $I_1$ and $I_2$ must remain equal to the source current I. The "current mirror" effect caused by the transistors 58, 60 and 62 then causes a corresponding decrease in the current $I_1'$. The net effect is that substantially the entire increase in $V_c$ is dropped across the resistor 100, thereby causing the base voltages $V_a$ and $V_b$ to remain equal. $V_b$ is hence "clamped" to $V_a$. Reference to FIG. 2 shows that this clamping action has the effect of shunting the resistor 78 so as to reduce the gain of the (B−Y) demodulator.

Looking at the operation of the transistors 54–62 from another standpoint, it can be seen that a "closed loop" or feedback type arrangement is provided for maintaining the corrected (B−Y) signal at a selected level. Specifically, the level of the (B−Y) signal at lead 90 is sensed by the transistor 56 so that any increase in that signal results in increased conduction in the transistor 56 and decreased conduction by the transistors 54 and 62, thereby holding the (B−Y) signal at lead 90 to the reference established at the base of the transistor 54. A decrease in the amplitude of the (B−Y) signal has a similar effect. Because of this feedback arrangement, the color correction developed is quite predictable and reproducible.

Turning now to a consideration of the transistor 86 shown in FIG. 2, it will be appreciated that the (B−Y) output across the load resistors 76 and 78 is a function of the voltage on the lead 80 as well as a function of whatever voltage is present at the emitter of the transistor 86. Similarly, the (R−Y) and (G−Y) demodulators may each have a load impedance coupled between current sources like 70 and 72 and the emitter of a transistor such as transistor 86. In the case where the base terminal 102 of the transistor 86 receives a d.c. voltage, that voltage will provide a d.c. reference upon which the (B−Y) signal is superimposed. With a similar configuration for the other demodulators, all color difference output signals will be referenced to the same d.c. voltage. Alternately, the transistor 86 may additionally receive the luminance or "Y" signal so that the output across resistors 78 and 76 is a "B" or blue signal rather than a color difference signal. Of course, the other demodulators will, in that case, also be configured to develop green and red signals.

An advantage of the illustrated connection of transistor 86 to the color difference load impedance is that, when color correction is effected, the axis toward which the corrected signals are shifted is easily selected. That selection is effected by the inclusion of the resistor 82 between the base terminal of the transistor 54 and the emitter terminal of the transistor 86. In effect, the inclusion of the resistor 82, and its illustrated connection to the (B−Y) demodulator and the transistor 86, adds a preselected voltage offset to the output of the (B−Y) demodulator simultaneously with the gain reduction of the (B−Y) demodulator. The value of the offset is, in this embodiment, determined by the value of the resistor 82. That value is selected such that demodulated chroma signals occurring within the color correction range are offset toward the fleshtone axis.

More specifically, it can be seen that if the value of resistor 82 is negligibly small, the voltage on the lead 90 will be substantially equal to the voltage at the emitter of the transistor 86 during color correction, due to the clamping by which Va is clamped to Vb. However, increasing the value of the resistor 82 lowers the voltage Vb with respect to the voltage at the emitter of the transistor 86 by a predetermined amount. Hence, during color correction, the voltage Vb is equal to the voltage at the emitter of the transistor 86 less the voltage drop across the resistor 82. Accordingly, the d.c. reference level of the (B−Y) color difference signal is offset downwardly by a fixed amount relative to the d.c reference levels of the other color difference signals because those other color difference signals do not include such an offset.

The result of adding such an offset is to add a fixed negative (B−Y) component during color correction for shifting the axis of color correction toward the fleshtone axis. Such shifting has been found to be desirable because reducing the gain of the (B−Y) demodulator as previously described tends to correct colors to an axis closer to the (R−Y) axis. The offset described above then shifts the axis of correction counter-clockwise toward the fleshtone axis.

It will be appreciated that the inclusion of the offset in combination with gain reduction of the (B−Y) demodulator provides a very flexible system. For example, the amount of correction desired for a particular application is easily selected by choosing an appropriate amount of gain reduction for the (B−Y) demodulator. In the illustrated embodiment, such reduction is easily accomplished by choosing appropriate values for the resistors 76 and 78. In addition, the axis toward which colors are corrected is easily selected by choosing a desired amount of voltage offset, such as by choosing the appropriate value for the resistor 82. Hence, the amount of color correction and the axis of correction are easily selectable to meet various requirements and subjective determinations.

The illustrated embodiment meets the objectives of the invention by providing color correction circuitry which is readily fabricated with integrated circuit technology. The amount of correction and the axis of correction depend primarily on the ratio of resistors. As is well known, such ratios are maintained well in integrated circuits. In addition, the use of differential amplifiers takes advantage of the fact that the transistors from which such amplifiers are constructed are well matched in integrated circuits. Their performance is very predictable and reliable, thereby providing a color correction circuit giving predictable and repeatable performance from receiver to receiver.

Although the invention has been described with reference to a preferred circuit arrangement, it will be obvious to those skilled in the art in light of this disclosure that many alterations and modifications may be made to the preferred arrangement without departing from the invention. Accordingly, it is intended that all such modifications and alterations be included within the spirit and scope of the invention as defined by the appended claims.

What is claimed is:

1. In a television receiver adapted to receive chroma signals for demodulation thereof by a (B−Y) demodulator, an (R−Y) demodulator, and means for generating a (G−Y) demodulated signal, a color corrector for automatically correcting selected chroma signals so that their effective phase is more nearly along a fleshtone axis, comprising:
   means for generating a control signal in response to demodulator outputs indicative of reception of chroma signals in a selected phase range encompassing the fleshtone axis; and
   means coupled to the (B−Y) demodulator and responsive to the control signal for modifying the gain of the (B−Y) demodulator such that the output thereof is reduced by a predetermined factor, and for adding a predetermined negative (B−Y) component to the output of the (B−Y) demodulator, the amount of said component being selected such that demodulated chroma signals occurring with said range encompassing the fleshtone axis are offset toward the fleshtone axis;
   whereby fleshtone chroma signals which otherwise appear too blue or too green are given a more natural color as a result of the reduced amplitude of their (B−Y) component, and the addition of said negative (B−Y) component causes the resultant color correction to be centered about the fleshtone axis.

2. A color corrector as set forth in claim 1 wherein said modifying means adds a preselected d.c. voltage offset to the output of the (B−Y) demodulator.

3. A color corrector as set forth in claim 1 wherein said control signal generating means receives demodulated (R−Y), (B−Y) and (G−Y) chroma signals and generates the control signal in response to the instantaneous value of the received (R−Y) chroma signal being greater than the instantaneous sum of the received (B−Y) and (G−Y) chroma signals, whereby the control signal is generated only for chroma signals whose phase is within a selected range of the fleshtone axis.

4. A color corrector as set forth in claim 3 wherein the sum of the demodulated (B−Y) and (G−Y) chroma signals includes a known d.c. voltage level, and wherein the demodulated (R−Y) chroma signal applied to the control signal generating means includes a selected lower d.c. voltage level than that of the sum of the (B−Y) and (G−Y) chroma signals, whereby the range over which the control signal generating means generates the control signal is limited to that range wherein the instantaneous value of the demodulated (R−Y) chroma signal and its lower d.c. voltage level exceeds the sum of the instantaneous value of the (G−Y) and (B−Y) demodulated chroma signals, thereby also inhibiting generation of the control signal when no chroma signal is received by the television receiver.

5. A color corrector as set forth in claim 3 wherein said control signal generating means comprises an electronic switch which turns on for developing the control signal and turns off for terminating the control signal, and wherein turn-on of said switch actuates said modifying means and turn-off of said switch de-activates said modifying means.

6. A color corrector as set forth in claim 5 wherein said switch comprises a differential amplifier having a pair of input terminals and an output terminal for coupling said control current to said modifying means, one of said input terminals receiving the sum of the demodulated (B−Y) and (G−Y) chroma signals and the other of said input terminals receiving the demodulated (R−Y) chroma signal, whereby the control current is generated in said output terminal when the value of the signal at said one input terminal is less than the value of the signal at said other input terminal.

7. A color corrector as set forth in claim 6 wherein the sum of the demodulated (B−Y) and (G−Y) chroma signals applied to said one input terminal of the differential amplifier includes a known d.c. voltage level, and wherein the demodulated (R−Y) chroma signal applied to said other input terminal of the differential amplifier includes a selected lower d.c. voltage level than that applied to said one input terminal, whereby the range over which the differential amplifier generates its control signal is limited to a preselected range, thereby also inhibiting color correction when no chroma signal is received by the television receiver.

8. A color corrector as set forth in claim 1 wherein the (B−Y) demodulator includes a load impedance whose value controls the gain of the (B−Y) demodulator, and wherein said modifying means reduces the value of the load impedance in response to the control signal.

9. A color corrector as set forth in claim 8 wherein said load impedance includes a plurality of serially coupled impedances, and wherein said modifying means responds to said control signal by clamping a junction between adjacent of said serially coupled impedances to a d.c. voltage.

10. A color corrector as set forth in claim 8 wherein said load impedance includes a plurality of serially connected impedances and said modifying means shunts at least one of said impedances in response to said control signal.

11. A color corrector as set forth in claim 10 wherein said modifying means includes at least a pair of transistors mutually coupled as a differential amplifier whose emitter current is supplied by said control signal for turning the differential amplifier on only when the control signal is generated, and wherein the differential amplifier is disposed in a circuit arrangement with said load impedances such that at least one of said impedances is shunted when the differential amplifier is turned on.

12. A color corrector as set forth in claim 11 wherein one end of said serially connected impedances is coupled to the output of the (B−Y) demodulator, the other end of said serially connected impedances is coupled to a first base input of the differential amplifier, and a junction between adjacent impedances is coupled to a second base input of the differential amplifier, and wherein the differential amplifier is coupled in a circuit arrangement such that, when the differential amplifier is on, both base inputs are maintained at substantially the same voltage level, thereby effectively shunting the impedance between the said junction and the first base input when the differential amplifier is on.

13. A color corrector as set forth in claim 12 wherein the circuit arrangement of said differential amplifier includes a collector circuit comprising transistors coupled in a current mirror configuration.

14. In a television receiver adapted to receive chroma signals for demodulation thereof by a (B−Y) demodulator, an (R−Y) demodulator, and means for generating a (G−Y) demodulated signal, and wherein the (B−Y) demodulator includes a load impedance, a color corrector for automatically correcting selected chroma signals so that their effective phase is more nearly along a fleshtone axis, comprising:
means receiving demodulated (R−Y), (B−Y) and (G−Y) chroma signals for generating a control signal in response to the instantaneous value of the received (R−Y) chroma signal being greater than the instantaneous sum of the received (B−Y) and (G−Y) chroma signals;
means coupled to the (B−Y) demodulator and responsive to the control signal for reducing the value of the load impedance of the (B−Y) demodulator by a predetermined factor, and for simultaneously adding a predetermined negative (B−Y) component to the output of the (B−Y) demodulator,
whereby the reduction in the load impedance of the (B−Y) demodulator reduces the gain thereof so that fleshtone chroma signals which otherwise appear too blue or too green are given a more natural color as a result of the reduced amplitude of their (B−Y) component, and the addition of said negative (B−Y) component causes the resultant color correction to be centered about the fleshtone axis.

15. A color corrector as set forth in claim 14 wherein the sum of the demodulated (B−Y) and (G−Y) chroma signals includes a known d.c. voltage level, and wherein the demodulated (R−Y) chroma signal applied to the control signal generating means includes a selected lower d.c. voltage level than that of the sum of the (B−Y) and (G−Y) chroma signals, whereby the range over which the control signal generating means generates the control signal is limited to that range wherein the instantaneous value of the demodulated (R−Y) chroma signal and its lower d.c. voltage level exceeds the sum of the instantaneous value of the (G−Y) and (B−Y) demodulated chroma signals, thereby also inhibiting generation of the control signal when no chroma signal is received by the television receiver.

16. A color correction circuit as set forth in claim 15 wherein said control signal generating means comprises an electronic switch which turns on for developing the control signal and turns off for terminating the control signal, and wherein turn-on of said switch actuates said modifying means and turn-off of said switch de-activates said modifying means.

17. A color corrector as set forth in claim 14 wherein the (B−Y) load impedance includes a plurality of serially connected impedances and said modifying means shunts at least one of said impedances in response to said control signal for reducing the gain of the (B−Y) demodulator.

18. A color corrector as set forth in claim 17 wherein said impedance shunting is effected by clamping a junction between adjacent of said serially coupled impedances to a d.c. voltage.

19. A color correction circuit as set forth in claim 17 wherein said modifying means includes at least a pair of transistors mutually coupled as a differential amplifier whose emitter current is supplied by said control signal for turning the differential amplifier on only when the control signal is generated, and wherein the differential amplifier is disposed in a circuit arrangement with said load impedances such that at least one of said impedances is shunted when the differential amplifier is turned on.

20. A color corrector as set forth in claim 19 wherein one end of said serially connected impedances is coupled to the output of the (B−Y) demodulator, the other end of said serially connected impedances is coupled to a first base input of the differential amplifier, and a junction between adjacent impedances is coupled to a second base input of the differential amplifier, and wherein the differential amplifier is coupled in a circuit arrangement such that, when the differential amplifier is on, both base inputs are maintained at substantially the same voltage level, thereby effectively shunting the impedance between the said junction and the first base input when the differential amplifier is on.

21. In a television receiver adapted to receive chroma signals for demodulation thereof by a (B−Y) demodulator, an (R−Y) demodulator, and means for generating a (G−Y) demodulated signal, and wherein the (B−Y) demodulator includes a load impedance, a color corrector for automatically correcting selected chroma signals so that their effective phase is more nearly along a fleshtone axis, comprising:

means receiving demodulated (R−Y), (B−Y) and (G−Y) chroma signals for generating a control signal in response to the instantaneous value of the received (R−Y) chroma signal being greater than the instantaneous sum of the received (B−Y) and (G−Y) chroma signals;

color modifying means including a pair of transistors coupled as a differential amplifier whose emitter current is supplied by said control signal for turning the differential amplifier on only when the control signal is generated, said differential amplifier being coupled in a circuit arrangement and to the load impedance of the (B−Y) demodulator such that, when the differential amplifier is on, a portion of the voltage developed across said load impedance is clamped to a d.c. voltage for reducing the gain of the (B−Y) demodulator, whereby fleshtone chroma signals which otherwise appear too blue or too green are given a more natural color as a result of the reduced amplitude of their (B−Y) component.

* * * * *